US012032762B2

(12) United States Patent
Reynolds et al.

(10) Patent No.: US 12,032,762 B2
(45) Date of Patent: Jul. 9, 2024

(54) IP KVM DEVICES

(71) Applicant: Hewlett-Packard Development Company, L.P., Spring, TX (US)

(72) Inventors: Douglas A. Reynolds, Fort Collins, CO (US); Peter Andrew Seiler, Fort Collins, CO (US); Byron A Alcorn, Fort Collins, CO (US); Eric John Gressman, Fort Collins, CO (US); Gregory Mark Hughes, Fort Collins, CO (US); J. Michael Stahl, Fort Collins, CO (US); Patrick S Anderson, Fort Collins, CO (US); Joseph-Jonathan Salzano, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/249,294

(22) PCT Filed: Oct. 21, 2020

(86) PCT No.: PCT/US2020/056639
§ 371 (c)(1),
(2) Date: Apr. 17, 2023

(87) PCT Pub. No.: WO2022/086520
PCT Pub. Date: Apr. 28, 2022

(65) Prior Publication Data
US 2023/0400939 A1 Dec. 14, 2023

(51) Int. Cl.
*G06F 3/038* (2013.01)
*G06F 13/38* (2006.01)

(52) U.S. Cl.
CPC ............ *G06F 3/038* (2013.01); *G06F 13/382* (2013.01); *G06F 2203/0383* (2013.01); *G06F 2213/0042* (2013.01)

(58) Field of Classification Search
CPC .................. G06F 3/038; G06F 13/382; G06F 2203/0383; G06F 2213/0042; G06F 13/4045; G06F 13/4282; G06F 13/385
See application file for complete search history.

(56) References Cited

U.S. PATENT DOCUMENTS

| 2006/0107061 A1 | 5/2006 | Holovacs |
| 2007/0115992 A1 * | 5/2007 | Weinstock .............. G06F 3/023 370/392 |

(Continued)

FOREIGN PATENT DOCUMENTS

| CN | 102622094 A * | 8/2012 | ......... C04B 22/0093 |
| CN | 102622094 A | 8/2012 | |

(Continued)

*Primary Examiner* — David D Davis
(74) *Attorney, Agent, or Firm* — Knobbe, Martens, Olson & Bear, LLP

(57) ABSTRACT

One example of an internet protocol (IP) keyboard, video, mouse (KVM) device includes a universal serial bus (USB) port, a display port, a network port, a Bluetooth transceiver, a processor, and a memory. The USB port is to be communicatively coupled to a host device. The display port is to be communicatively coupled to the host device. The network port is to be communicatively coupled to a network. The processor is communicatively coupled to the USB port, the display port, the network port, and the Bluetooth transceiver. The memory stores a unique identifier to be transmitted to a client device via Bluetooth in response to establishing a Bluetooth connection between the client device and the IP KVM device. The unique identifier is used by the client device to establish a remote connection to the IP KVM device.

19 Claims, 6 Drawing Sheets

(56) References Cited

U.S. PATENT DOCUMENTS

| | | | |
|---|---|---|---|
| 2008/0222326 A1 | 9/2008 | Liu et al. | |
| 2011/0063211 A1 | 3/2011 | Hoerl et al. | |
| 2012/0317182 A1* | 12/2012 | Husain | H04L 69/12 709/203 |
| 2013/0167208 A1 | 6/2013 | Shi | |
| 2014/0056171 A1 | 2/2014 | Clegg | |
| 2014/0082142 A1* | 3/2014 | Geffin | H04L 41/32 709/217 |
| 2015/0256390 A1 | 9/2015 | Palmer et al. | |
| 2017/0315950 A1 | 11/2017 | Whitney | |
| 2018/0284449 A1 | 10/2018 | Shimizu et al. | |

FOREIGN PATENT DOCUMENTS

| | | |
|---|---|---|
| CN | 209911963 U | 1/2020 |
| JP | 2017-045097 A | 3/2017 |
| TW | I526868 B | 3/2016 |
| WO | 2015/028446 A1 | 3/2015 |

\* cited by examiner

IP KVM DEVICES

BACKGROUND

Internet protocol (IP) keyboard, video, mouse (KVM) devices (e.g., dongles) may be used to enable a user to access a host device (e.g., server, workstation, computer, etc.) over a network. An IP KVM device may capture universal serial bus (USB) signals (e.g., keyboard signals, mouse signals, peripheral device signals, etc.) and video signals from the host device and encode them into packets for transmission over an ethernet link to a remote client device (e.g., computer). The remote client device may then decode the signals and output the video signals to a single display or multiple displays and use the USB signals for USB devices connected to the host device and/or the client device.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Internet protocol (IP) keyboard, video, mouse (KVM) devices enable a user to connect to remote host devices (e.g., computer systems). The IP KVM device is connected to the remote host device and captures and emulates the keyboard, video, and mouse devices. To connect to a specific host device through an IP KVM device, the user must know some information that uniquely identifies the IP KVM device, such as the IP KVM's hostname or IP address. Most host devices do not advertise this information. Therefore, while a user may have physical access to a host device with an attached IP KVM device, the user may be unable to connect to the IP KVM device due to a lack of information. Being able to identify and connect to a host device through an IP KVM device to which a user has physical access would be beneficial in numerous situations. For example, an IT administrator could easily identify and connect to one of many computer systems in a server rack. An instructor could easily identify and connect to one of their student's computer systems in a classroom. A convention attendee could easily identify and connect to a computer system demonstrating a product on the convention floor.

Accordingly, as disclosed herein, an IP KVM device connected to a host device (e.g., server, workstation, etc.) may include a unique identifier that may be used by a client device to establish a remote connection between the client device and the IP KVM device. In one example, the unique identifier may be transmitted to the client device via a Bluetooth connection. In another example, the unique identifier may be visible on the IP KVM device (e.g., a QR code) and scanned or manually input into the client device. The client device may then use the unique identifier to obtain connection information to establish a remote connection between the client device and the IP KVM device over a network.

Figure 1A:
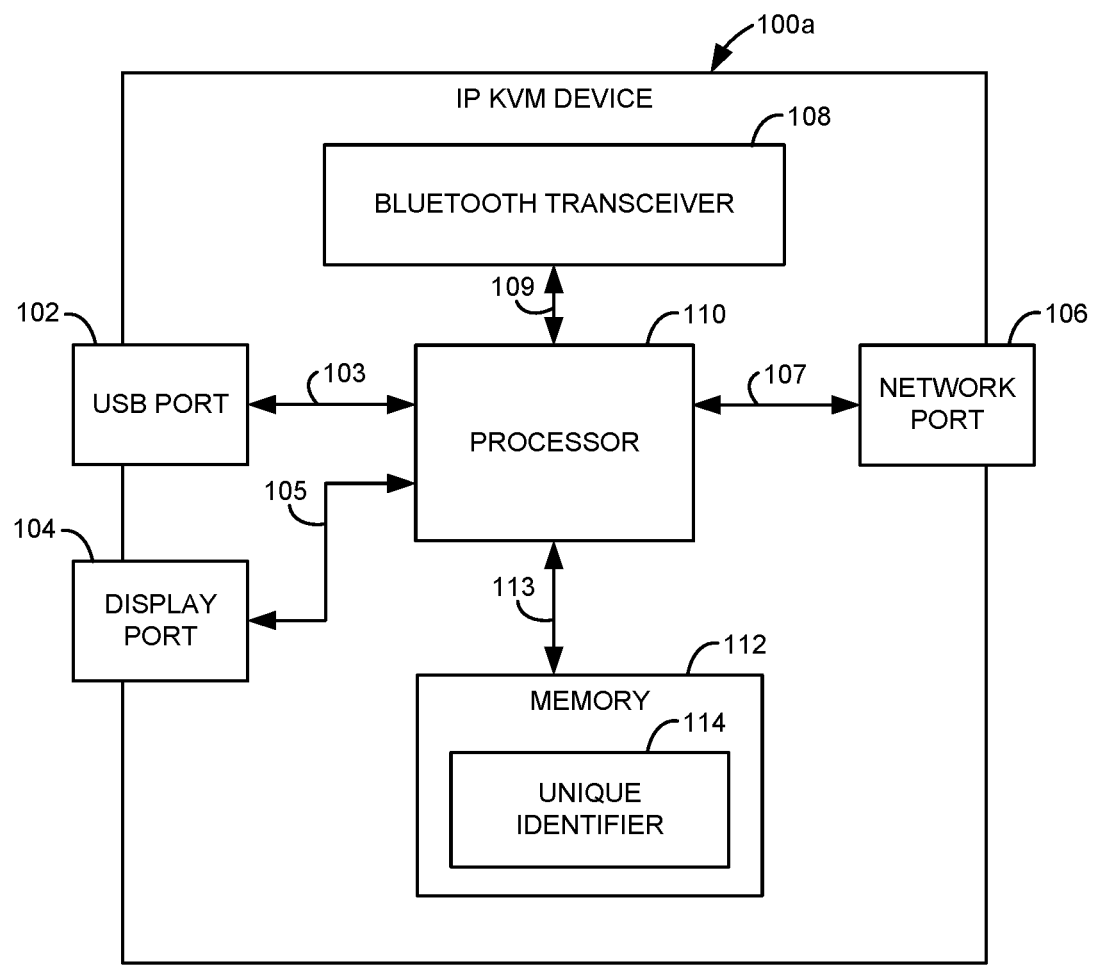
FIG. 1A is a block diagram illustrating one example of an internet protocol (IP) keyboard, video, mouse (KVM) device.

FIG. 1A is a block diagram illustrating one example of an IP KVM device 100a. IP KVM device 100a includes a universal serial bus (USB) port 102, a display port 104 (e.g., digital visual interface (DVI) port, high-definition multimedia interface (HDMI) port, video graphics array (VGA) port, DisplayPort port), a network port 106 (e.g., ethernet port), a Bluetooth transceiver 108, a processor 110, and a memory 112. The processor 110 is communicatively coupled to the USB port 102 through a communication path 103, the display port 104 through a communication path 105, the network port 106 through a communication path 107, the Bluetooth transceiver 108 through a communication path 109, and the memory 112 through a communication path 113.

As will be described in more detail below with reference to FIG. 2, the USB port 102 may be communicatively coupled to a host device (not shown). The display port 104 may be communicatively coupled to the host device. The network port 106 may be communicatively coupled to a network (not shown). The memory 112 stores a unique identifier 114 to be transmitted to a client device via Bluetooth in response to establishing a Bluetooth connection between the client device and the IP KVM device 100a. The unique identifier 114 may be used by the client device to establish a remote connection to the IP KVM device 100a.

The processor 110 may include a central processing unit (CPU), microprocessor, and/or other suitable logic circuitry for controlling the operation of IP KVM device 100a. In addition to unique identifier 114, memory 112 may store machine readable instructions (e.g., software and/or firmware) to be executed by processor 110 to control the operation of IP KVM device 100a. Memory 112 may include a random access memory (RAM), a read-only memory (ROM), or a combination thereof. In one example, the processor 110 may authenticate a user of the client device via Bluetooth (e.g., by requesting a username and password) prior to transmitting the unique identifier to the client device.

Figure 1B:
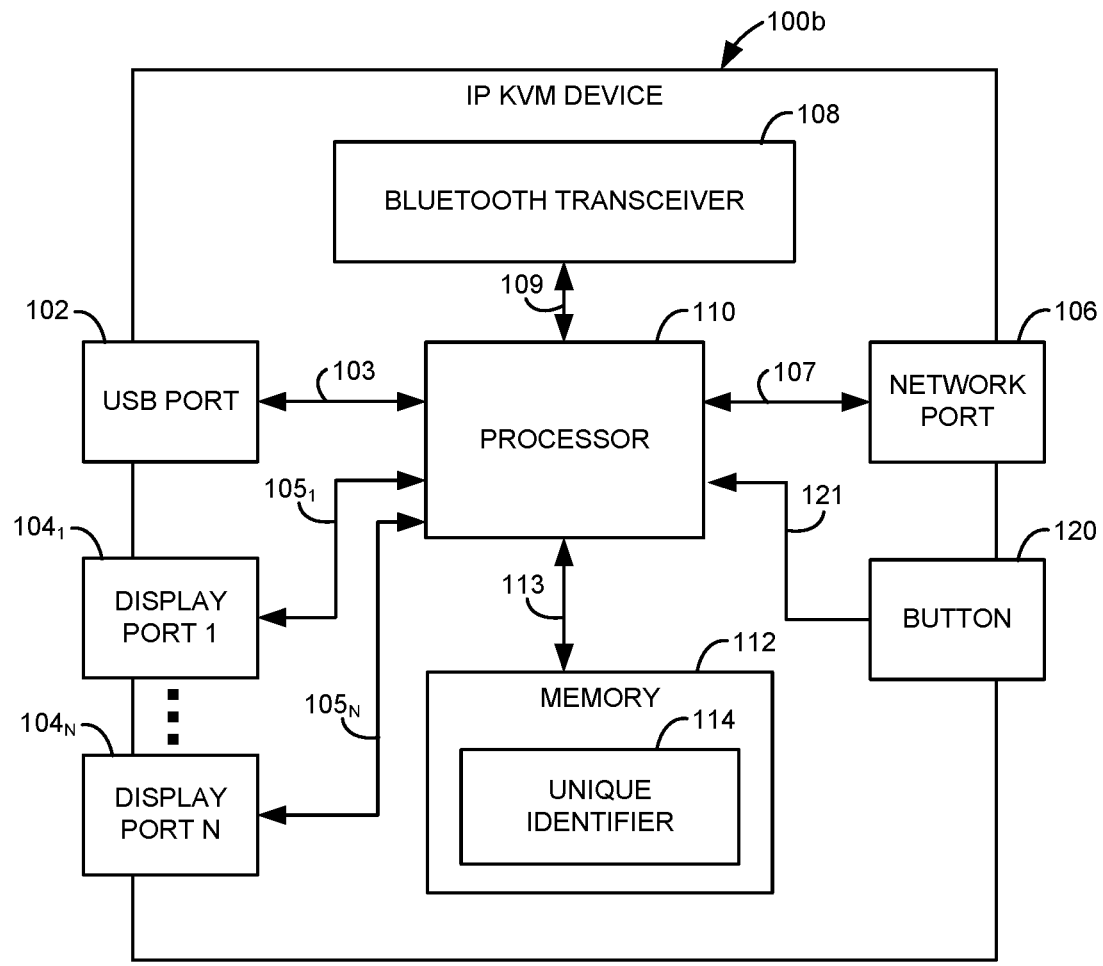
FIG. 1B is a block diagram illustrating another example of an IP KVM device.

FIG. 1B is a block diagram illustrating another example of an IP KVM device 100b. IP KVM device 100b is similar to IP KVM device 100a previously described and illustrated with reference to FIG. 1A, except that IP KVM device 100b includes a button 120 and a plurality of display ports $104_1$ to $104_N$, where "N" is any suitable number of display ports (e.g., 2-4). Each of the plurality of display ports $104_1$ to $104_N$ are communicatively coupled to the processor 110 through a communication path $105_1$ to $105_N$, respectively. Each of the plurality of display ports $104_1$ to $104_N$ may be communicatively coupled to the host device (not shown). Button 120 is electrically coupled to processor 110 through a signal path 121. In this example, the button 120 may be pressed by a user to initiate the Bluetooth connection between the client device and the IP KVM device 100*b*.

Figure 2:
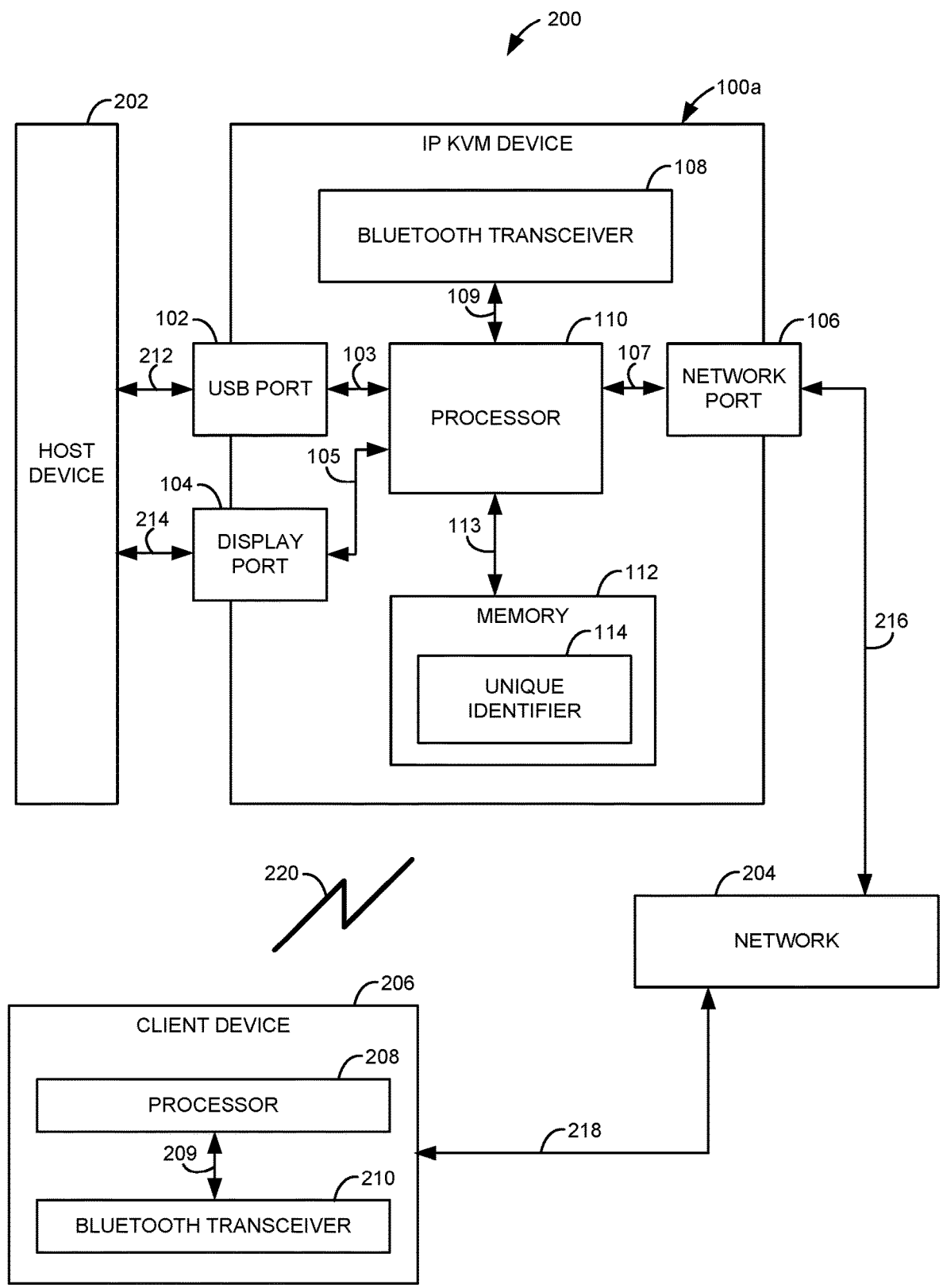
FIG. 2 is a block diagram illustrating one example of a system including an IP KVM device.

FIG. 2 is a block diagram illustrating one example of a system 200. System 200 includes an IP KVM device 100*a* as previously described and illustrated with reference to FIG. 1A, a host device 202, a network 204, and a client device 206. In other examples, IP KVM device 100*b* previously described and illustrated with reference to FIG. 1B may be used in place of IP KVM device 100*a* in system 200.

The USB port 102 of IP KVM device 100*a* is communicatively coupled to the host device 202 through a communication path 212 to receive USB signals from the host device. The display port 104 of IP KVM device 100*a* is communicatively coupled to the host device 202 through a communication path 214 to receive display signals from the host device. The processor 110 encodes the USB signals and display signals received from the host device 202 for transmission over the network 204. The network port 106 of IP KVM device 100*a* is communicatively coupled to the network 204 through a communication path 216 to transmit the encoded USB signals and display signals over the network 204.

Client device 206 is communicatively coupled to network 204 through a communication path 218. Client device 206 includes a processor 208 and a Bluetooth transceiver 210. The Bluetooth transceiver 210 is communicatively coupled to the processor 208 through a communication path 209. In this example, when a user of client device 206 desires to establish a remote connection to host device 202, the user establishes a Bluetooth connection indicated at 220 between Bluetooth transceiver 210 and Bluetooth transceiver 108. In response to the establishment of the Bluetooth connection 220, processor 110 of IP KVM device 100*a* transmits the unique identifier 114 to the client device 206 via the Bluetooth connection 220. In one example, the processor 110 may authenticate the user of client device 206 via the Bluetooth connection 220 (e.g., by requesting a username and password) prior to transmitting the unique identifier 114 to the client device. Client device 206 then uses the unique identifier 114 to establish a remote connection to the IP KVM device 100*a* to access host device 202. In one example, the remote connection to the IP KVM device 100*a* is established over the network 204. In another example, the remote connection to the IP KVM device 100*a* is established over the Bluetooth connection 220. In this case, the communication path 218 between the client device 206 and the network 204 may be excluded.

Figure 3:
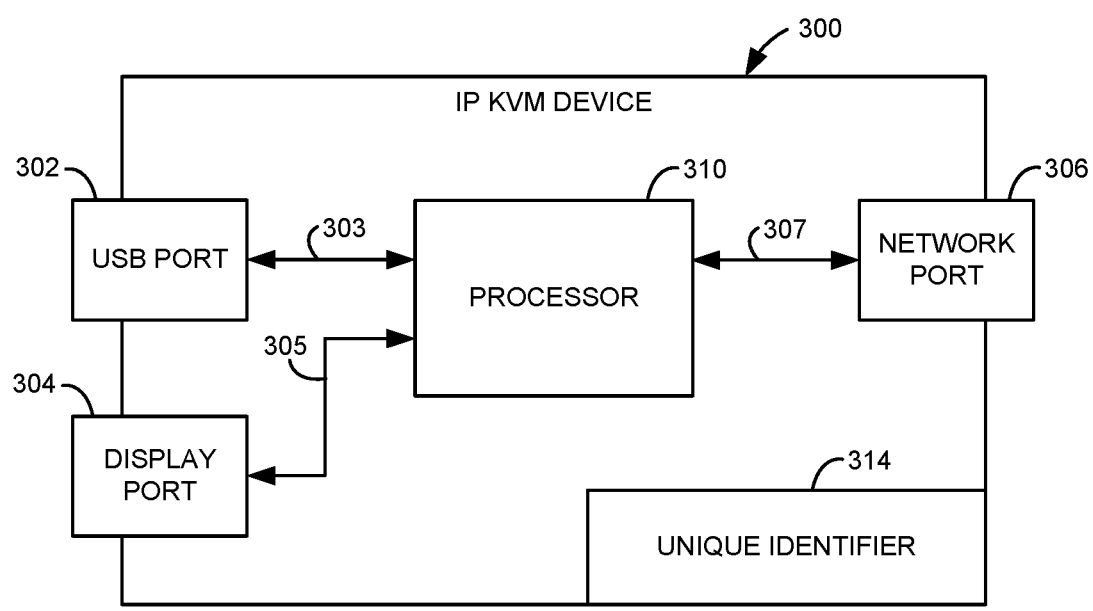
FIG. 3 is a block diagram illustrating another example of an IP KVM device.

FIG. 3 is a block diagram illustrating another example of an IP KVM device 300. IP KVM device 300 includes a USB port 302, a display port 304 (e.g., DVI port, HDMI port, VGA port, DisplayPort port), a network port 306 (e.g., ethernet port), a processor 310, and a unique identifier 314. The processor 310 is communicatively coupled to the USB port 302 through a communication path 303, the display port 304 through a communication path 305, and the network port 306 through a communication path 307.

As will be described in more detail below with reference to FIG. 4, the USB port 302 may be communicatively coupled to a host device (not shown). The display port 304 may be communicatively coupled to the host device. The network port 306 may be communicatively coupled to a network (not shown). The unique identifier 314 is on the IP KVM device 300. In one example, the unique identifier 314 is visible on the IP KVM device 300, such that a user may physically view or read the unique identifier 314. The unique identifier 314 may include a quick response (QR) code. In other examples, the unique identifier 314 may have another suitable form (e.g., bar code, text, etc.). The unique identifier may be input to a client device to establish a remote connection between the client device and the IP KVM device 300 over the network.

The processor 310 may include a CPU, microprocessor, and/or other suitable logic circuitry for controlling the operation of IP KVM device 300. Processor 310 may execute machine readable instructions (e.g., software and/or firmware) to control the operation of IP KVM device 300. In one example, IP KVM device 300 may include a memory 112 (FIG. 1A) storing a unique identifier 114 matching the unique identifier 314. In this case, as will be described in more detail below with reference to FIG. 5, the visible unique identifier 314 may be entered into a client device, and the client device may then scan the network to find the IP KVM device storing the matching unique identifier 114.

Figure 4:
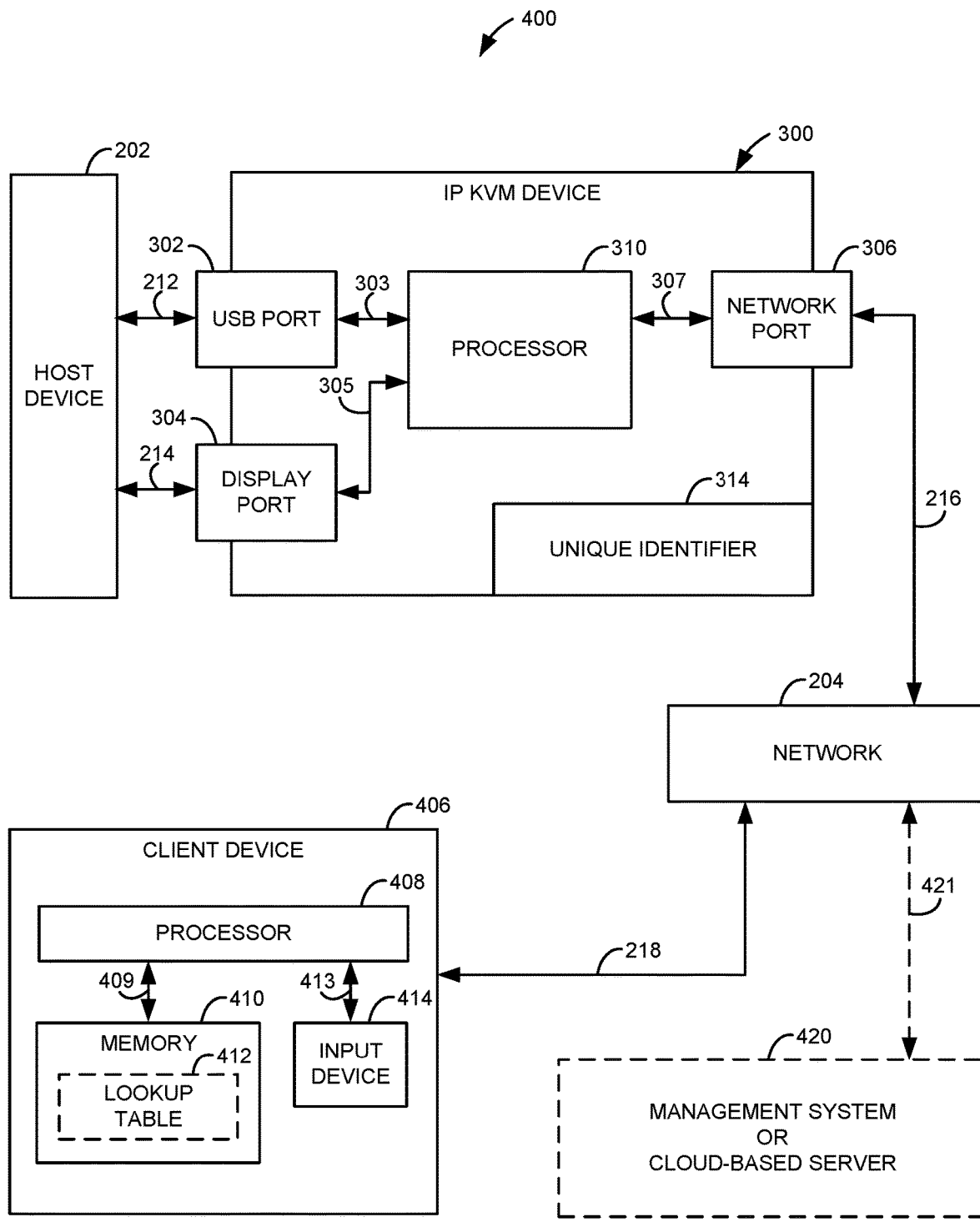
FIG. 4 is a block diagram illustrating another example of a system including an IP KVM device.

FIG. 4 is a block diagram illustrating another example of a system 400. System 400 includes an IP KVM device 300 as previously described and illustrated with reference to FIG. 3, a host device 202, a network 204, and a client device 406. The USB port 302 of IP KVM device 300 is communicatively coupled to the host device 202 through a communication path 212 to receive USB signals from the host device. The display port 304 of IP KVM device 300 is communicatively coupled to the host device 202 through a communication path 214 to receive display signals from the host device. The processor 310 encodes the USB signals and display signals received from the host device 202 for transmission over the network 204. The network port 306 of IP KVM device 300 is communicatively coupled to the network 204 through a communication path 216 to transmit the encoded USB signals and display signals over the network 204.

Client device 406 is communicatively coupled to network 204 through a communication path 218. Client device 406 includes a processor 408, a memory 410, and an input device 414 (e.g., keyboard, mouse, camera, bar code scanner, QR code scanner, etc.). The processor 408 is communicatively coupled to the memory 410 through a communication path 409 and the input device 414 through a communication path 413. In this example, when a user of client device 406 desires to establish a remote connection to host device 202, the user enters the unique identifier 314 on IP KVM device 300 into client device 406 via input device 414. Client device 406 then establishes a remote connection between the client device 406 and the IP KVM device 300 over the network 204 based on the unique identifier 314 so that client device 406 can access host device 202.

In one example, the client device 406 may access a lookup table 412 stored in memory 410 to obtain connection information for the IP KVM device 300 based on the unique identifier 314. In another example, the client device 406 may access a management system or cloud-based server 420, which may be communicatively coupled to the network 204 through a communication path 421, to obtain connection information for the IP KVM device 300 based on the unique identifier 314. The lookup table, management system, or cloud-based server may contain data linking a unique identifier for each IP KVM device on the network to connection information for each respective IP KVM device. Therefore, by accessing the lookup table, management system, or cloud-based server, a client device 406 may establish a remote connection to a selected IP KVM device using the unique identifier 314 of the selected IP KVM device. If the connection information for an IP KVM device is changed, the lookup table, management system, or cloud-based server may be updated to link the unique identifier for the IP KVM device to the new connection information.

Figure 5:
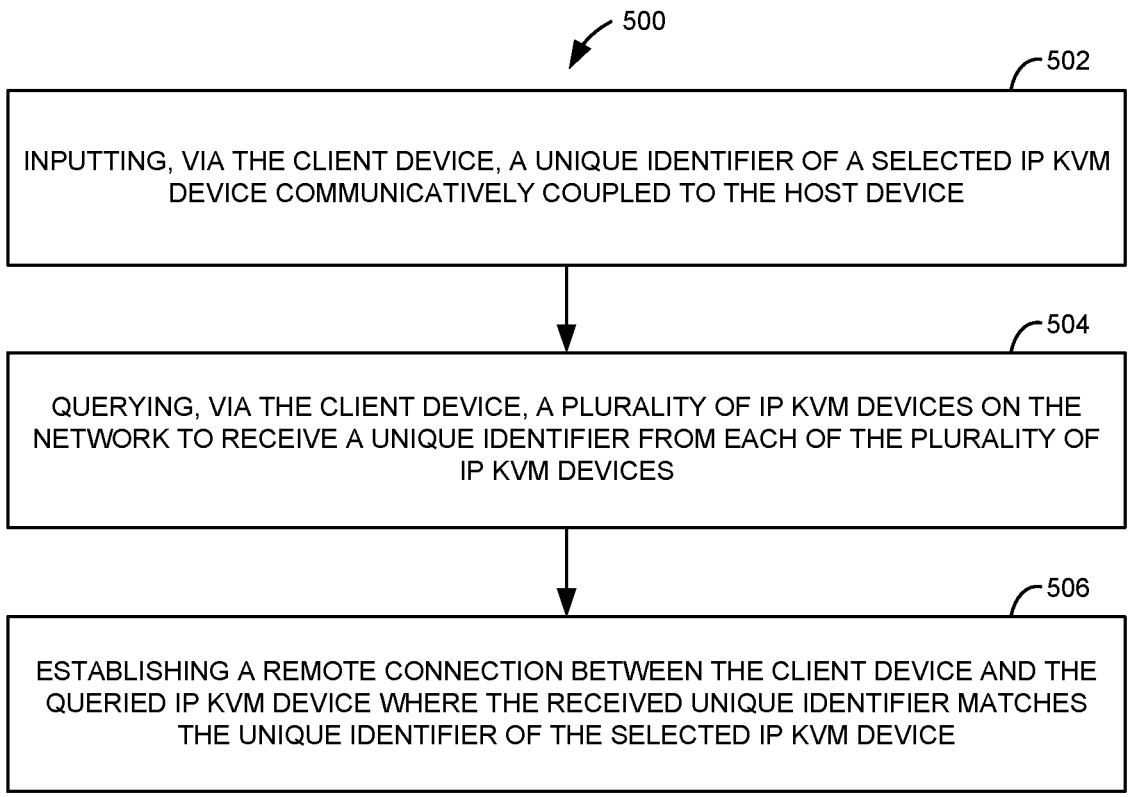
FIG. 5 is a flow diagram illustrating one example of a method for connecting a client device to a host device over a network.

FIG. 5 is a flow diagram illustrating one example of a method 500 for connecting a client device (e.g., client device 406) to a host device (e.g., host device 202) over a network (e.g., network 204). At 502, method 500 includes inputting, via the client device (e.g., via input device 414), a unique identifier of a selected IP KVM device communicatively coupled to the host device. At 504, method 500 includes querying, via the client device, a plurality of IP KVM devices on the network to receive a unique identifier from each of the plurality of IP KVM devices. At 506, method 500 includes establishing a remote connection between the client device and the queried IP KVM device where the received unique identifier matches the unique identifier of the selected IP KVM device.

In one example, inputting the unique identifier of the selected IP KVM device includes scanning, via the client device, a quick response (QR) code on the selected IP KVM device. In another example, inputting the unique identifier of the selected IP KVM device includes entering, via the client device, a unique identifier displayed on the selected IP KVM device. In one example, each of the plurality of IP KVM devices may include a processor and a memory communicatively coupled to the processor, where the memory stores the unique identifier for the IP KVM device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An internet protocol (IP) keyboard, video, mouse (KVM) device comprising:
   a universal serial bus (USB) port to be communicatively coupled to a host device;
   a display port to be communicatively coupled to the host device;
   a network port to be communicatively coupled to a network;
   a Bluetooth transceiver;
   a memory storing a unique identifier to be transmitted to a client device via Bluetooth in response to establishing a first connection between the client device and the IP KVM device, the unique identifier used by the client device to establish a second connection to the IP KVM device, wherein the first connection is a Bluetooth connection and the second connection is a remote connection different from the first connection; and
   a processor communicatively coupled to the USB port, the display port, the network port, and the Bluetooth transceiver, the processor to, in response to the first connection, provide the unique identifier to the client device, and establish the second connection in response to a request from the client device generated using the unique identifier.

2. The IP KVM device of claim 1, wherein the remote connection to the IP KVM device is established over the network.

3. The IP KVM device of claim 1, wherein the processor is to authenticate a user of the client device via Bluetooth prior to transmitting the unique identifier to the client device.

4. The IP KVM device of claim 1, further comprising:
   a button to initiate the Bluetooth connection between the client device and the IP KVM device.

5. The IP KVM device of claim 1, wherein the unique identifier comprises a machine-readable code.

6. The IP KVM device of claim 5, wherein the machine-readable code comprises a bar code or a quick response code.

7. The IP KVM device of claim 1, wherein the unique identifier comprises text.

8. An internet protocol (IP) keyboard, video, mouse (KVM) device comprising:
   a universal serial bus (USB) port to be communicatively coupled to a host device;
   a display port to be communicatively coupled to the host device;
   a network port to be communicatively coupled to a network;
   a unique identifier on the IP KVM device, the unique identifier to be transmitted to a client device via a first connection and input to the client device to establish a second connection between the client device and the IP KVM device over the network; and
   a processor communicatively coupled to the USB port, the display port, and the network port, the processor to, in response to the first connection, provide the unique identifier to the client device, and establish the second connection in response to the unique identifier input to client device.

9. The device of claim 8, wherein the unique identifier is visible on the IP KVM device.

10. The device of claim 8, wherein the unique identifier comprises a quick response (QR) code.

11. The device of claim 8, wherein the client device is to access a management system to obtain connection information for the IP KVM device based on the unique identifier.

12. The device of claim 8, wherein the client device is to access a cloud-based server to obtain connection information for the IP KVM device based on the unique identifier.

13. The device of claim 8, wherein the client device is to access a lookup table to obtain connection information for the IP KVM device based on the unique identifier.

14. The IP KVM device of claim 8, wherein the unique identifier comprises a machine-readable code.

15. A method for connecting a client device to a host device over a network, the method comprising:
   inputting, via the client device, a unique identifier of a selected IP KVM device communicatively coupled to the host device;
   querying, via the client device, a plurality of IP KVM devices on the network to receive a unique identifier from each of the plurality of IP KVM devices over a first connection, wherein the first connection is a Bluetooth connection; and
   in response to the first connection, providing the unique identifier to the client device, and establishing a second connection between the client device and the queried IP KVM device in response to a request from the client device generated using the unique identifier, where the received unique identifier matches the unique identifier of the selected IP KVM device.

16. The method of claim 15, wherein inputting the unique identifier of the selected IP KVM device comprises scanning, via the client device, a quick response (QR) code on the selected IP KVM device.

17. The method of claim 15, wherein inputting the unique identifier of the selected IP KVM device comprises entering, via the client device, a unique identifier displayed on the selected IP KVM device.

18. The method of claim 15, wherein each of the plurality of IP KVM devices comprises:
  a processor; and
  a memory communicatively coupled to the processor, the memory storing the unique identifier for the IP KVM device.

19. The method of claim 15, wherein the unique identifier comprises a machine-readable code.

\* \* \* \* \*